(12) United States Patent
Feazle et al.

(10) Patent No.: US 12,717,570 B2
(45) Date of Patent: Aug. 25, 2026

(54) PLUG-AND-PLAY SOFTWARE AND FIRMWARE INTEGRATION

(71) Applicant: Halliburton Energy Services, Inc., Houston, TX (US)

(72) Inventors: Colette Elan Feazle, Houston, TX (US); Kiran Gopala Reddy Sunanda, Houston, TX (US); Ranganathan Sridharan, Houston, TX (US); William David Bethancourt, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 244 days.

(21) Appl. No.: 18/605,767

(22) Filed: Mar. 14, 2024

(65) Prior Publication Data

US 2025/0291573 A1 Sep. 18, 2025

(51) Int. Cl.

| | |
|---|---|
| ***G06F 9/44*** | (2018.01) |
| ***G06F 8/61*** | (2018.01) |
| ***G06F 8/65*** | (2018.01) |
| ***G06F 9/445*** | (2018.01) |
| ***G06F 9/45*** | (2006.01) |
| ***G06F 9/455*** | (2018.01) |

(52) U.S. Cl.

CPC .................. *G06F 8/65* (2013.01); *G06F 8/61* (2013.01); *G06F 9/44526* (2013.01)

(58) Field of Classification Search

CPC ... G06F 8/65; G06F 8/654; G06F 8/61; G06F 9/44526

See application file for complete search history.

(56) References Cited

U.S. PATENT DOCUMENTS 8,145,464 B2 3/2012 Arnegaard et al.
9,575,779 B1 * 2/2017 Wewers .............. G06F 9/44526

(Continued)

FOREIGN PATENT DOCUMENTS

DE 102022108711 A1 * 10/2022 ............... G06F 8/41
JP 2011060232 3/2011

(Continued)

OTHER PUBLICATIONS

Arthur H. Hartog, Distributed Sensors in the Oil and Gas Industry, 2021, pp. 151-186. https://ieeexplore.ieee.org/xpl/ebooks/bookPdfWithBanner.jsp?fileName=9261278.pdf&bkn=9261257&pdfType=chapter (Year: 2021).*

(Continued)

*Primary Examiner* — Mongbao Nguyen
(74) *Attorney, Agent, or Firm* — DeLizio, Peacock, Lewin & Guerra LLP

(57) ABSTRACT

A computing system executing a surface software application as part of a decoupled software architecture includes detecting that an update is available for a software plugin component of the surface software application. Each software plugin component is associated with a respective feature of the surface software application and in communication with a respective firmware component and a respective hardware component. A dependency matrix mapping compatibilities with plugin components, hardware components, and firmware components is evaluated to determine whether the update is compatible with the respective hardware component. The update is installed upon a determination that the plugin is compatible.

20 Claims, 5 Drawing Sheets

(56) References Cited

U.S. PATENT DOCUMENTS

| | | | | |
|---|---|---|---|---|
| 10,740,078 | B2 * | 8/2020 | Hoff | G06F 8/61 |
| 12,293,182 | B2 * | 5/2025 | Zimmer | G06F 8/654 |
| 12,435,611 | B2 * | 10/2025 | Rojas | H04L 63/029 |
| 2009/0222497 | A1 | 9/2009 | Ryan | |
| 2012/0204142 | A1 | 8/2012 | Rubenstein et al. | |
| 2016/0253166 | A1 | 9/2016 | Rubenstein et al. | |
| 2021/0048991 | A1 * | 2/2021 | Tanner | G06F 8/4434 |
| 2022/0091838 | A1 | 3/2022 | Lee et al. | |
| 2022/0276849 | A1 * | 9/2022 | Games | G06F 8/60 |
| 2022/0349300 | A1 | 11/2022 | Fox | |
| 2022/0398087 | A1 | 12/2022 | Chopra et al. | |
| 2023/0098023 | A1 * | 3/2023 | Kirmse | G06F 21/57<br>707/769 |
| 2024/0126530 | A1 * | 4/2024 | Kairali | G06F 8/61 |
| 2024/0143344 | A1 * | 5/2024 | Campos | G06F 9/44526 |
| 2024/0338184 | A1 * | 10/2024 | Bendert | G06F 8/433 |
| 2025/0045377 | A1 * | 2/2025 | Jreij | G06F 21/53 |

FOREIGN PATENT DOCUMENTS

| | | | | |
|---|---|---|---|---|
| WO | WO-2013006226 | A1 * | 1/2013 | G06F 9/44526 |
| WO | 2016028973 | A1 | 2/2016 | |
| WO | WO-2019055649 | A1 * | 3/2019 | G06T 1/00 |
| WO | 2021101546 | A1 | 5/2021 | |

OTHER PUBLICATIONS

Yanjun Zuo, A Blockchain-Based IoT Framework for Oil Field Remote Monitoring and Control, 2022, pp. 1-18. https://ieeexplore.ieee.org/stamp/stamp.jsp?tp=&arnumber=9665728 (Year: 2022).*

Rishi et al. (DE 102022108711 A1), 2022, pp. 1-57. (Year: 2022).*

Gupta et al. (CA 3152158 A1), 2021, pp. 1-98. (Year: 2021).*

Eldon (WO 2021030376 A1), 2021, pp. 1-81. (Year: 2021).*

Brown et al. (WO 2013/006226 A1), 2013, pp. 1-11. (Year: 2013).*

“PCT Application No. PCT/US2024/020478 International Search Report and Written Opinion”, Dec. 9, 2024, 8 pages.

* cited by examiner

PLUG-AND-PLAY SOFTWARE AND FIRMWARE INTEGRATION

TECHNICAL FIELD

The present disclosure generally relates to downhole equipment and systems, and more generally, to an integration system for surface software and firmware for downhole equipment and systems.

BACKGROUND

In an oil and gas environment, an application system includes versioned surface software and firmware embedded to downhole equipment (e.g., sensors, measurement devices, and other tools). Surface software may pertain to a software platform executing on one or more computing systems, typically located on-site and above ground. The software platform generally performs one or more functions to manage and optimize on-site operations, such as drilling operations management (e.g., planning, monitoring, and optimizing drilling activities), production monitoring and optimization, facility and asset management, data management and integration, safety and environmental compliance, equipment sensing and control (e.g., measurement while drilling functions), remote monitoring and control, device communications, and so on. Generally, the software platform is a closed architecture, in which surface software components and firmware are synchronized with the hardware. Given compatibility dependencies between the software, firmware, and hardware, performing installations or updates for the software, firmware, or hardware can be time consuming and result in lengthy non-productive time in a drilling operation.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Embodiments of the present disclosure provide a computing system running in settings such as an oil and gas environment, in which the computing system has a surface software application providing an architecture that decouples applications and functions typically performed by surface software in the oil and gas environment (e.g., well planning, modeling, analysis, drilling, etc., also collectively referred to herein as "features") from respective firmware and hardware components. The architecture further modularizes each feature into a software "plugin" component that is able to be modified independently of other plugins within the software architecture. Further, the software architecture may maintain dependency data that maps software plugin features with capabilities of the hardware based on dependencies between the software plugins, firmware components, and hardware. Doing so allows the software to rapidly install and/or update software plugins or firmware in the field, such as in instances where a new version of software or firmware is released, a new feature is added, or new hardware is installed. An operator user can select available features, which can trigger automated discovery and installation workflows of compatible individual surface software plugins and firmware as soon as hardware is connected. Advantageously, the software architecture of the present disclosure can result in an improved and streamlined installation and update process, thereby reducing any potential system (and rig) downtime as a result.

Figure 1:
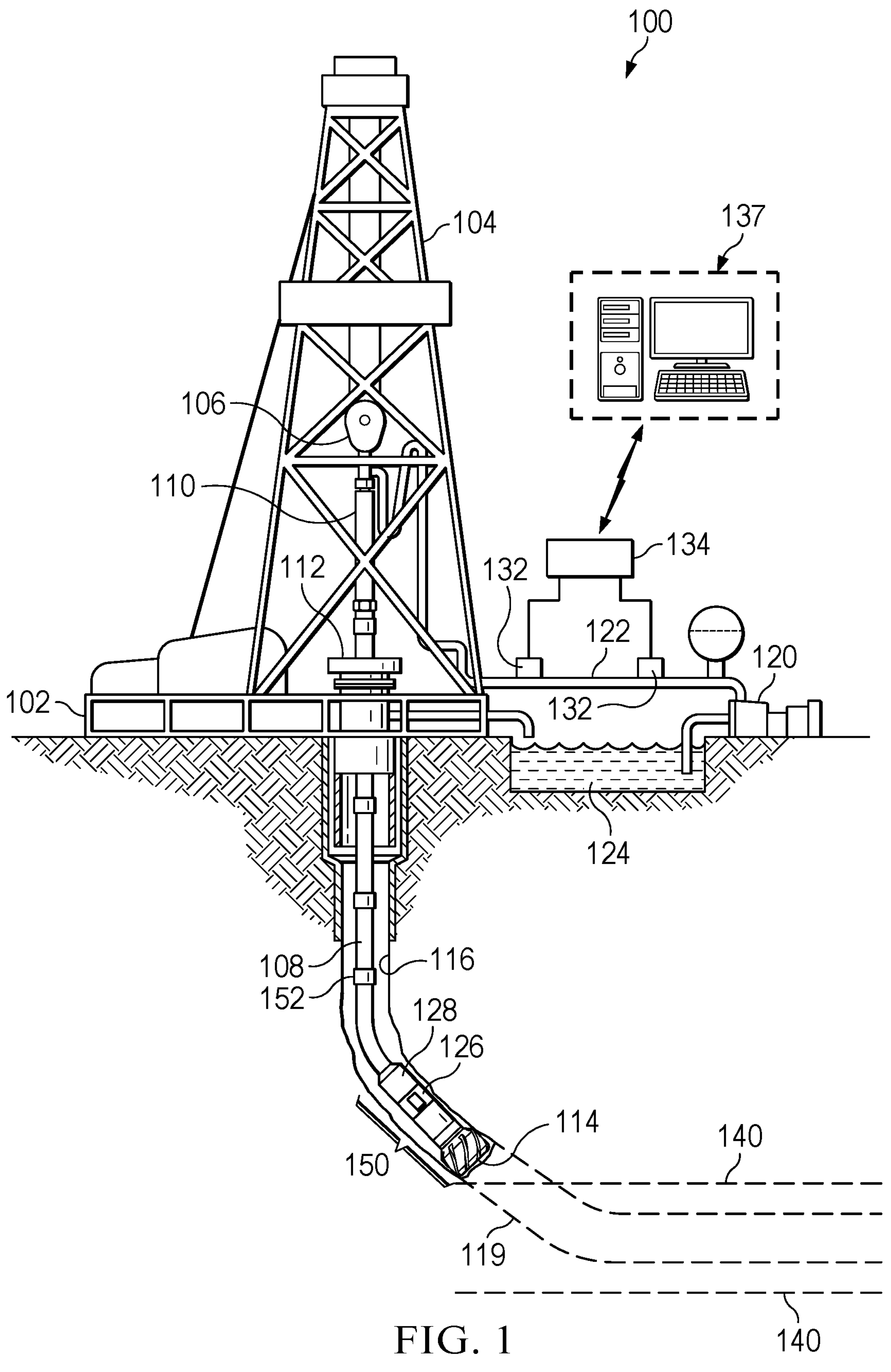
FIG. 1 illustrates an example downhole environment executing a decoupled software computing architecture, according to some embodiments of the present disclosure.

Referring now to FIG. 1, an example oil and gas environment to which the technologies described herein may be adapted is now shown. Particularly, FIG. 1 depicts a directional drilling environment showing a measurement-while-drilling (MWD) system 100. As depicted, the MWD system 100 includes a drilling platform 102 having a derrick 104 and a hoist 106 to raise and lower a drill string 108. Hoist 106 suspends a top drive 110 suitable for rotating drill string 108 and lowering drill string 108 through a well head 112. Notably, drill string 108 may include hardware sensors or other instrumentation for detecting and logging nearby characteristics and conditions of the wellbore and surrounding earth formation.

In operation, top drive 110 supports and rotates drill string 108 as it is lowered through well head 112. In this manner, drill string 108 (and/or a downhole motor) rotate a drill bit 114 coupled with a lower end of drill string 108 to create a borehole 116 through various formations. A pump 120 can circulate drilling fluid through a supply pipe 122 to top drive 110, down through an interior of drill string 108, through orifices in drill bit 114, back to the surface via an annulus around drill string 108, and into a retention pit 124. The drilling fluid can transport cuttings from wellbore 116 into pit 124 and helps maintain wellbore integrity. As shown, the drill bit 114 forms part of a bottom hole assembly 150, which further includes drill collars (e.g., thick-walled steel pipe) that provide weight and rigidity to aid drilling processes.

Detection tools 126 and a telemetry sub 128 are coupled to or integrated with one or more drilling collars.

Detection tools 126 may gather MWD survey data or other data and may include various types of electronic sensors, transmitters, receivers, hardware, software, and/or additional interface circuitry for generating, transmitting, and detecting signals (e.g., sonic waves, etc.), storing information (e.g., log data), communicating with additional equipment (e.g., surface equipment, processors, memory, clocks input/output circuitry, etc.), and the like. In particular, detection tools 126 can measure data such as position, orientation, weight-on-bit, strains, movements, borehole diameter, resistivity, drilling tool orientation, which may be specified in terms of a tool face angle (rotational orientation), and inclination angle (the slope), and compass direction, each of which can be derived from measurements by sensors (e.g., magnetometers, inclinometers, and/or accelerometers, though other sensor types such as gyroscopes, etc.).

Telemetry sub 128 communicates with detection tools 126 and transmits telemetry data to surface equipment (e.g., via mud pulse telemetry). For example, telemetry sub 128 can include a transmitter to modulate resistance of drilling fluid flow thereby generating pressure pulses that propagate along the fluid stream at the speed of sound to the surface. One or more pressure transducers 132 operatively convert the pressure pulses into electrical signal(s) for a signal digitizer 134. It is appreciated other forms of telemetry such as acoustic, electromagnetic, telemetry via wired drill pipe, and the like may also be used to communicate signals between downhole drilling tools and signal digitizer 134. Further, it is appreciated telemetry sub 128 can store detected and logged data for later retrieval at the surface when bottom hole assembly 150 is recovered.

Digitizer 134 converts the pressure pulses into a digital signal and sends the digital signal over a communication link to a computing system 137 or some other form of a data processing device. In at least some embodiments, computer system 137 includes processing units to analyze collected data and/or perform other operations by executing surface software components and/or instructions obtained from a local or remote non-transitory computer-readable medium. As shown, computer system 137 includes input device(s) (e.g., a keyboard, mouse, touchpad, etc.) as well as output device(s) (e.g., monitors, printers, etc.). These input/output devices provide a user interface that enables an operator to interact and communicate with the borehole assembly 150, surface/downhole directional drilling components, and/or software executed by computer system 137.

For example, the surface software provided by computer system 137 enables an operator to select or program directional drilling options, review or adjust types of data collected, modify values derived from the collected data (e.g., measured bit position, estimated bit position, bit force, bit force disturbance, rock mechanics, etc.), adjust borehole assembly dynamics model parameters, generate drilling status charts, waypoints, a desired borehole path, an estimated borehole path, and/or to perform other tasks. In at least some embodiments, the directional drilling performed by borehole assembly 150 is based on a surface and/or downhole feedback loops.

MWD system 100 also includes a controller 152 that instructs or steers bottom hole assembly 150 as drill bit 114 extends wellbore 116 along a desired path 119 (e.g., within one or more boundaries 140). Controller 152 includes processors, sensors, and other hardware/software such as a rotary steerable system (RSS). In operation, the controller 152 applies a force to flex or bend a drilling shaft coupled to the borehole assembly 150 thereby imparting an angular deviation to a current the direction traversed by drill bit 114. The controller 152 can communicate real-time data with one or more components of borehole assembly 150 and/or surface equipment. In this manner, the controller 152 can analyze real-time data and generate steering signals according to, for example, the feedback control techniques discussed herein. While the controller 152 is shown and described as a single component that operates for a particular type of directional drilling, it is appreciated the controller 152 may include any number of sub-components that collectively communicate and operate to perform the above discussed functions. The controller 152 represents an example component, which may further include various other types of steering mechanisms as well—e.g., steering vanes, a bent sub, and the like. It is further appreciated by those skilled in the art, the environment shown in FIG. 1 is merely provided as a reference example and not for purposes of limitation. The detection tools, drilling devices, and sliding mode control techniques discussed herein may be suitable in any number of drilling environments, and oil and gas environments generally. It is further appreciated by those skilled in the art, the environment shown in FIG. 1 is provided for purposes of discussion only, not for purposes of limitation.

Figure 2:
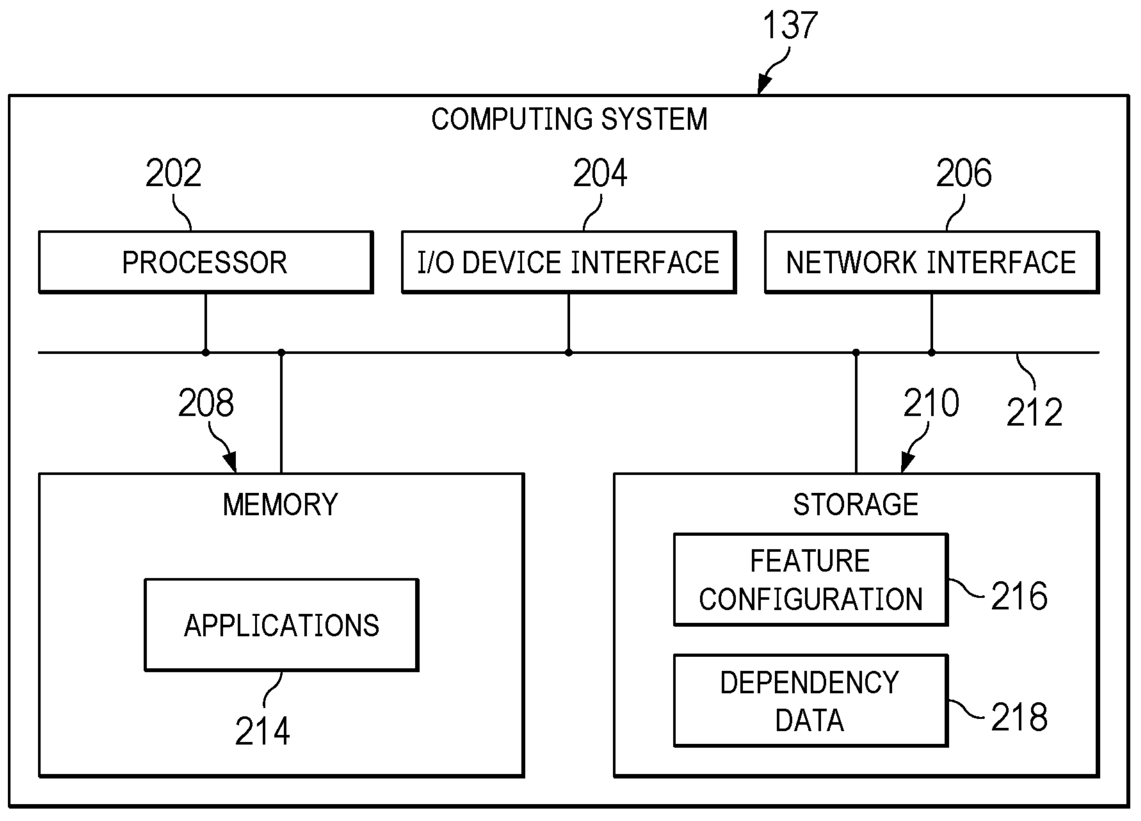
FIG. 2 illustrates an example computing system configured to execute one or more modularized plugins within a decoupled software computing architecture, according to some embodiments of the present disclosure.

As stated, the computing system 137 provides surface software that allows an operator to access, select, and program various features associated with the hardware and operations described above. In some embodiments, the computing system 137 is also configured to perform control techniques and communicate signals that steer or direct the drilling tool along a well path trajectory. Referring now to FIG. 2, a block diagram of an computing system 137 is shown. In an embodiment, the computing system 137. Illustratively, the computing system 137 includes a processor 202, an I/O device interface 204, network interface 206, memory 208, and a storage 210, each interconnected via a hardware bus 212. Of course an actual computing system 137 will include a variety of additional hardware components not shown. Additionally, in some embodiments, one or more of the illustrative components may be incorporated in, or otherwise form a portion of, another component.

The processor 202 retrieves and executes programming instructions stored in the memory 208. The processor 202 may be embodied as one or more processors, each processor being a type capable of performing the functions described herein. For example, the processor 202 may be embodied as a single or multi-core processor(s), a microcontroller, or other processor or processing/controlling circuit. In some embodiments, the processor 202 may be embodied as, include, or be coupled to a field programmable gate array (FPGA), an application-specific integrated circuit (ASIC), reconfigurable hardware or hardware circuitry, or other specialized hardware to facilitate performance of the functions described herein. The hardware bus 212 is used to transmit instructions and data between the processor 202, storage 210, network interface 204, and the memory 208. The processor 202 is included to be representative of a single CPU, multiple CPUs, a single CPU having multiple processing cores, and the like. The memory 208 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

The I/O device interface 204 allows I/O devices to communicate with hardware and software components of the computing system 137. For example, the I/O device interface 204 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate input/output operations. In some embodiments, the I/O device interface 204 may form a portion of a system-on-a-chip (SoC) and be incorporated, along with one or more of the processor 202, memory 208, and other components of the computing system 137.

The network interface 206 may be embodied as any hardware, software, or circuitry (e.g., a network interface card) used to connect the computing system 137 over a network and providing network communication component functions. For example, the network interface 206 may be embodied as any communication circuit, device, or collection thereof, capable of enabling communications over the network between the computing system 137 and other devices (e.g., components of the borehole assembly 150, a remote server from which to download software plugin components, firmware components, and software and firmware updates, etc.). The network interface 206 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication. For example, to do so, the network interface 206 may include a network interface controller (NIC, not shown), embodied as one or more add-in-boards, daughtercards, controller chips, chipsets, or other devices that may be used for network communications with remote devices. For example, the NIC may be embodied as an expansion card coupled to the I/O device interface 204 over an expansion bus such as PCI Express.

As shown, the memory 208 may include one or more surface software applications 214, which may be embodied as software and/or firmware for the aforementioned operations, such as communicating with drilling tools and downhole sensors. The storage 210 may be embodied as any type of devices configured for short-term or long-term storage of data such as, for example, memory devices and circuits, memory cards, hard disk drives (HDDs), solid-state drives (SSDs), or other data storage devices. The storage 210 may include a system partition that stores data and firmware code for the storage 210. The storage 210 may also include an operating system partition that stores data files and executables for an operating system. For instance, the illustrative storage 210 includes a feature configuration 216, which may be embodied as any data representing a current configuration of features and plugins enabled for the applications 214. The configuration may also specify associated firmware components and hardware components for a given feature or plugin. The storage 210 also includes dependency data 218, which may be embodied as any data that maps compatibilities between the surface software to hardware and firmware components. For example, the dependency data 218 may be embodied as a multidimensional matrix, providing information about available software plugin components and respective features (e.g., features relating to supporting high temperature operations, clock speed, drilling operation capabilities, etc.), available hardware components and respective features, and available firmware components and associated hardware. Other examples that might be included within the matrix are software library dependencies, programming language-based package dependencies, system dependencies (e.g., system-level resources or configurations such as operating system versions, capabilities of hardware, network configurations, etc.), downhole hardware dependencies, device driver requirements, application programming interface (API) dependencies, and runtime dependencies. Advantageously, the dependency data 218 allows the computing system 137 to programmatically track and manage compatibilities between different versions of plugins, firmware, and hardware, particularly as each scale in number.

Figure 3:
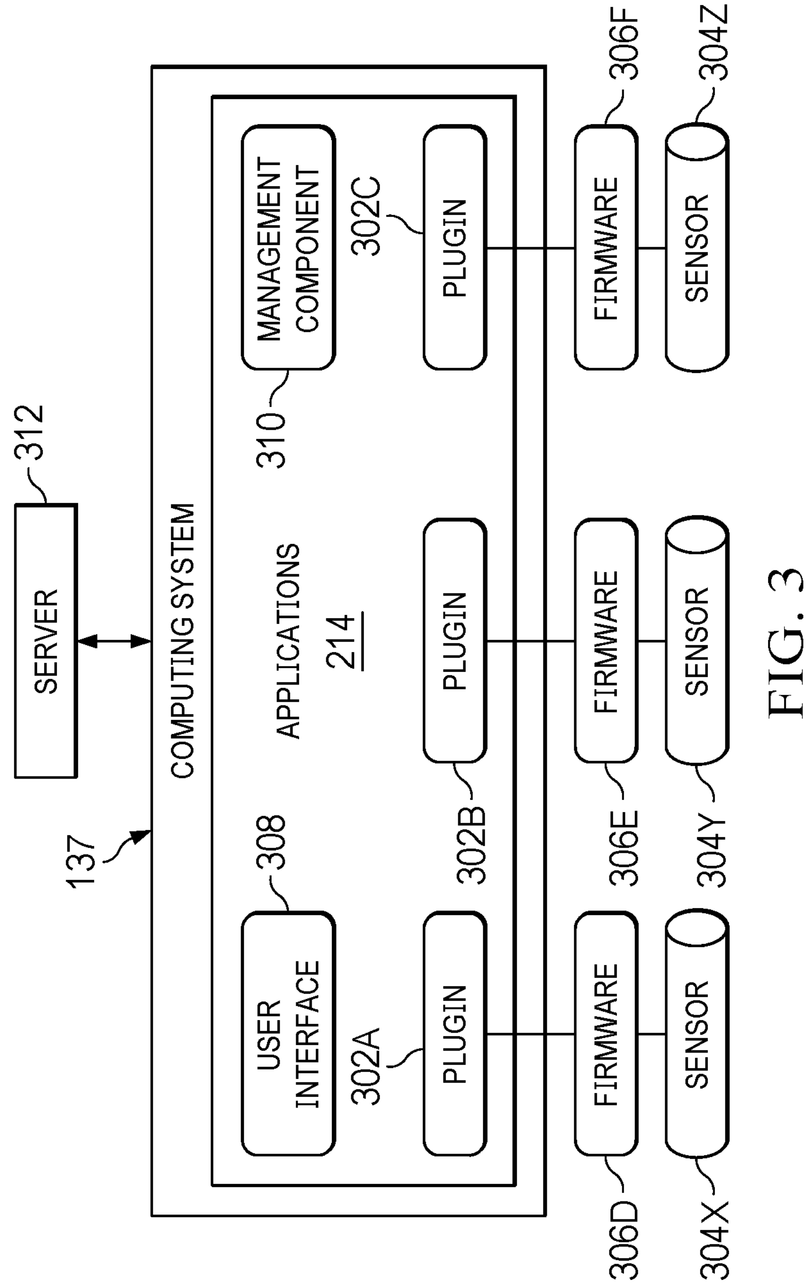
FIG. 3 illustrates a conceptual diagram of a decoupled software computing architecture having modularized plugins each compatible with a respective firmware component, according to some embodiments of the present disclosure.

Referring now to FIG. 3, a conceptual diagram of the decoupled software architecture of the present disclosure, in which the surface software applications 214 executing on the computing system 137 are discretized into separate plugins 302A-C, each plugin 302A-c associated with a respective firmware 306D-F, each firmware 306D-F being associated with a respective sensor 304*x*-*z*. Note, while FIG. 3 depicts three of each of the plugins 302, sensors 304, and firmware 306, this amount is used to simplify the example for purposes of explaining the broader inventive concept. In practice, the decoupled software architecture can include numerous plugins that may be associated with numerous firmware components and sensors. Illustratively, the applications 214 also include a user interface 308 and management component 310.

In some embodiments, each plugin 302A-c corresponds to a collection of predefined functions (e.g., application programming interface (API) functions) that, when invoked, cause the plugin 302 to perform a given action (e.g., send control signals to the respective sensor, obtain sensor data, generate analytics, etc.). Advantageously, discretizing the plugins 302A-c into separate collections reduces the complexity of updating the surface software when compared to traditional surface software, which typically adapts a closed software architecture. More particularly, rather than modifying the surface software code globally, updates in the decoupled software architecture involve modifying an individual plugin.

The user interface 308 may be rendered to a display of the computing system 137 to enable a user to view information relating to each plugin 302, determine which plugins 302 to enable (or install) or disable, identify which plugins (or features) and which versions are currently installed and/or enabled, view notifications relating to updates, and so on. The user interface 308 may present, to an operator user, a list of available plugins 302 and other information, such as features associated with a given plugin 302 and applicable hardware sensors 304 that the plugin 302 supports, system and firmware requirements, and the like. In some embodiments, the user interface 308 may present a list of features, each of which are mapped to one or more plugins 302 that support the given feature.

In some embodiments, the management component 310 is configured to identify whether a given plugin is compatible with a firmware component 306 and/or sensor 304 (or other hardware component). For example, the management component 310 may do so in response to an operator enabling a given feature from the aforementioned feature list. To do so, the management component 310 may evaluate the dependency data 218 and determine compatibility based on the dependency data 218. For instance, the management component 310 may form a query that indicates the specific plugin or feature, which in turn may be used to filter the dependency data 218 for compatible hardware and/or firmware. If incompatible, the management component 310 may also filter plugins and/or firmware that support the feature that are also compatible with the given sensor 304.

In some embodiments, the management component 310 may also establish communications with a server 312 over a network (e.g., the Internet). The server 312 may be embodied as a physical computing system or virtual computing instance (e.g., executing on a cloud provider network) that serves as a plugin and firmware repository for the decoupled software architecture. In addition, the server 312 may transmit notifications to the management component 310 regarding updates to plugins 302A-c and firmware 302D-F. In some embodiments, the management component 310 may, in turn, present the notifications on a display of the computing system 137 via the user interface 308 to confirm whether to retrieve and install the updates. In other embodiments, the management component 310 may automatically retrieve and install the updates to the plugins 302A-c and/or firmware 306D-F.

In some embodiments, the server 312 may also provide additional predefined dependency data, such as distinct dependency matrices that may be well-suited when deployed in a given use-case scenario (e.g., a dependency matrix specifically for drilling operation use cases, a dependency matrix specifically for facility and asset management use cases, a dependency matrix for remote monitoring and control). Distinct dependency matrices allow the operator to optimize the system and surface software for a given use case. Other examples in which additional dependency data may be deployed or otherwise obtained can include instances where a new downhole tool is installed on-site. In such cases, the management component 310 may query the server 312 obtain dependency data associated with the downhole tool. In other embodiments, the downhole tool may itself have dependency data embedded in its memory, and the management component 310 may establish a connection with the tool to retrieve the dependency data.

Figure 4:
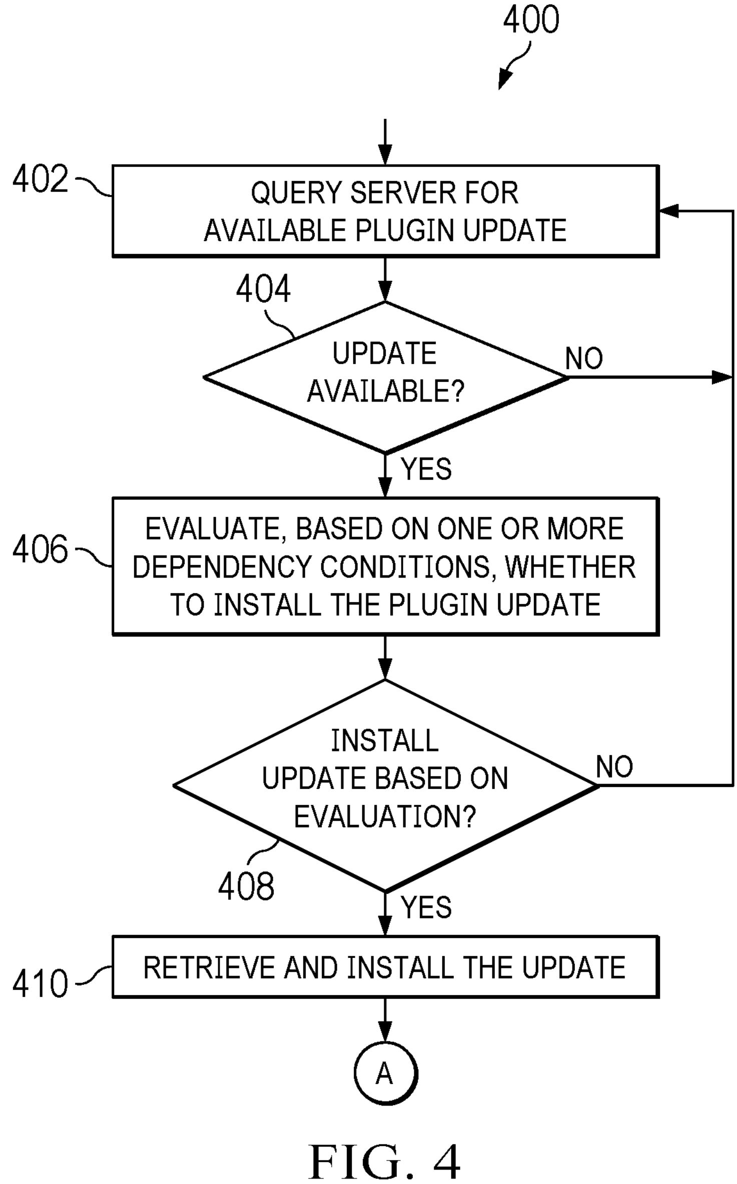
FIGS. 4 and 5 illustrate a flow diagram of an example method for installing and/or updating a modularized plugin or firmware component within a decoupled software computing architecture, according to some embodiments of the present disclosure.

The computing system 137, under the decoupled software architecture enables automatic discovery and updates for software plugins. Referring now to FIG. 4, the computing system 137, in operation, may perform a method 400 for automatically updating a plugin. As shown, the method 400 begins in block 402, in which the computing system 137 (e.g., via the management component 310) queries the server 312 for available updates for a given plugin. For example, the computing system 137 may do so in the event that the operator user enables, from the user interface 308, a feature from a list of features presented on a display of the computing device 137. In this example, the computing system 137 may transmit a query that includes a parameter identifying the feature (e.g., an identifier associated with the feature). Alternatively, or in addition, the computing system 137 may identify, based on the feature and an evaluation of the dependency data 218, plugins that support the feature. In other embodiments, the computing system 137 queries the server 312 when detecting that a new hardware component has been installed on-site (e.g., via communications sent from the hardware component to the computing system 137).

In block 404, the computing system 137 determines, based on a response from the server 312, whether an update is available. If not, then the method 400 returns to block 402. The computing system 137 may periodically query the server 312 for updates for the plugin. If an update is available, then in block 406, the computing system 137 evaluates, based on one or more dependency conditions and on information provided regarding the update (e.g., whether new features are added, version incompatibilities, etc.), whether to install the plugin update. For example, the computing system 137 may evaluate the dependency data 218 to identify whether compatibility issues for the update exist (e.g., whether the presently installed hardware or firmware only supports certain versions of the plugin, whether the update version creates dependency conflicts with the present configuration). In block 408, the computing system 137 determines, based on the evaluation, whether to install the update. For instance, the computing system 137 may install the update in the absence of any identified compatibility issues. In other instances, the computing system 137 may install the plugin in the event if a compatibility issue with the currently installed version of the firmware exists but not with another version of the firmware. In such cases, the computing system 137 may prompt, via the user interface 308, the operator user whether to proceed with the update. If the computing system 137 determines not to install the update, then the method 400 returns to block 402.

Otherwise, the method 400 proceeds to block 410, in which the computing system 137 retrieves the update from the server 312. In an embodiment, the update may be embodied as a software update package that can include an executable file or script that includes instructions that the computing system 137 performs to carry out the update. Thereafter, the computing system 137 installs the update. To do so, the computing system 137 may temporarily deactivate the plugin being updated and any hardware components associated with the plugin. The computing system 137 may then run the update and reactivate the plugin and components once the update is complete. Advantageously, because the updates only affect the plugin and associated firmware and hardware components, the computing system 137 is able to install the update to the plugin without having to take the entire system offline.

Figure 5:
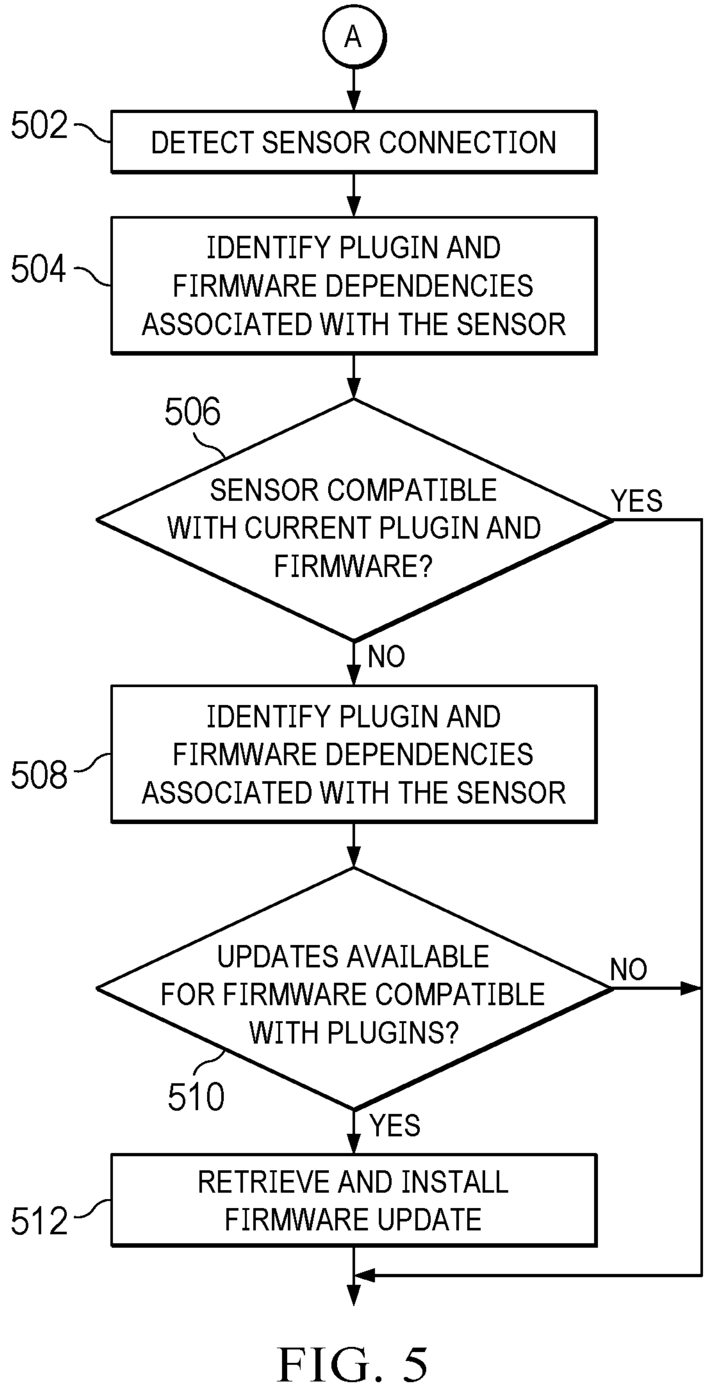

Referring now to FIG. 5, a flow diagram is shown for updating firmware and plugin components based on identified hardware dependencies. In some embodiments, the diagram of FIG. 5 may be an extension of the method 400, such as following the installation of the update to a plugin. Continuing this example, illustratively, in block 502, the computing system 137 (e.g., via the management component 310) detects a connection to the computing system 137 by a downhole sensor. In block 504, the computing system 137 identifies plugin and firmware dependencies associated with the sensor. For example, to do so, the computing system 137 may filter the dependency data 318 based on features and parameters associated with the currently installed sensor firmware and plugin. Doing so allows the computing system 137 to, in block 506, determine whether the sensor is compatible with the firmware and updated plugin. If compatible, then the method ends.

Otherwise, in block 508, the computing system 137 identifies plugin and firmware dependencies associated with the sensor. Doing so allows the computing system 137 to identify which updates may be necessary for the firmware and/or what other plugins may be required to install or update that are not presently part of the configuration. In block 510, the computing system 137 determines whether updates are available for firmware that may be compatible with the updated and/or installed plugins. For example, the dependencies identified in block 508 may be used in forming a query for the dependency data 218 to identify such updates. If no updates are available, then the method ends.

If updates are available, then in block 512, the computing system 137 retrieves and installs the firmware update. During this period, the computing system 137 may cause the underlying hardware component to go offline (e.g., by transmitting a control signal thereto) while the firmware is updating. Once installed, the computing system 137 may restart the hardware component and ensure that the plugin is able to communicate with the firmware and hardware component.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1 includes a system comprising one or more processors; a memory storing a plurality of instructions, which, when executed on the one or more processors, causes the system to detect that an update is available for one of a plurality of software plugin components of a surface software application executing on the system in an oil and gas environment, each software plugin component being associated with a respective one of a plurality of features of the surface software application, each plugin component in communication with a respective firmware component of a plurality of firmware components and a respective hardware component of a plurality of hardware components in the oil and gas environment; evaluate, based on a dependency matrix mapping compatibilities with the plurality of plugin components, hardware components, and firmware components, whether the update is compatible with the respective hardware component; and install, upon a determination that the update is compatible, the update on the system.

Clause 2 includes the subject matter of Clause 1, and wherein the plurality of instructions, when executed on the one or more processors, further causes the system to detect a connection of the plugin to the respective hardware component; identify, based on an evaluation of the dependency matrix, whether an update for the respective firmware component is available.

Clause 3 includes the subject matter of any of Clauses 1 and 2, and wherein the plurality of instructions, when executed on the one or more processors, further causes the system to, upon a determination that the update is available, install the update for the respective firmware component.

Clause 4 includes the subject matter of any of Clauses 1-3, and wherein the plurality of hardware components comprises downhole sensors in the oil and gas environment.

Clause 5 includes the subject matter of any of Clauses 1-4, and wherein to install the update on the system comprises to install the update to the one of the plurality of software plugin components while other of the plurality of software plugin components are executing on the system.

Clause 6 includes the subject matter of any of Clauses 1-5, and wherein the plurality of instructions further causes the system to retrieve, from a server, a second dependency matrix; and update the dependency matrix with information from the second dependency matrix.

Clause 7 includes the subject matter of any of Clauses 1-6, and wherein to evaluate whether the update is compatible with the respective hardware component comprises to query the dependency matrix to determine whether the update to the software plugin component is compatible with the respective firmware component and respective hardware component.

Clause 8 includes a computer-readable storage medium storing a plurality of instructions, which, when executed one one or more processors, causes a system in an oil and gas environment to detect that an update is available for one of a plurality of software plugin components of a surface software application executing on the system, each software plugin component being associated with a respective one of a plurality of features of the surface software application, each plugin component in communication with a respective firmware component of a plurality of firmware components and a respective hardware component of a plurality of hardware components in the oil and gas environment; evaluate, based on a dependency matrix mapping compatibilities with the plurality of plugin components, hardware components, and firmware components, whether the update is compatible with the respective hardware component; and install, upon a determination that the update is compatible, the update on the system.

Clause 9 includes the subject matter of Clause 8, and wherein the plurality of instructions, when executed on the one or more processors, further causes the system to detect a connection of the plugin to the respective hardware component; identify, based on an evaluation of the dependency matrix, whether an update for the respective firmware component is available.

Clause 10 includes the subject matter of any of Clauses 8 and 9, and wherein the plurality of instructions, when executed on the one or more processors, further causes the system to, upon a determination that the update is available, install the update for the respective firmware component.

Clause 11 includes the subject matter of any of Clauses 8-10, and wherein the plurality of hardware components comprises downhole sensors in the oil and gas environment.

Clause 12 includes the subject matter of any of Clauses 8-11, and wherein to install the update on the system comprises to install the update to the one of the plurality of software plugin components while other of the plurality of software plugin components are executing on the system.

Clause 13 includes the subject matter of any of Clauses 8-12, and wherein the plurality of instructions further causes the system to retrieve, from a server, a second dependency matrix; and update the dependency matrix with information from the second dependency matrix.

Clause 14 includes the subject matter of any of Clauses 8-13, and wherein to evaluate whether the update is compatible with the respective hardware component comprises to query the dependency matrix to determine whether the update to the software plugin component is compatible with the respective firmware component and respective hardware component.

Clause 15 includes a computer-implemented method comprising detecting, by a system in an oil and gas environment, that an update is available for one of a plurality of software plugin components of a surface software application executing on the system, each software plugin component being associated with a respective one of a plurality of features of the surface software application, each plugin component in communication with a respective firmware component of a plurality of firmware components and a respective hardware component of a plurality of hardware components in the oil and gas environment; evaluating, based on a dependency matrix mapping compatibilities with the plurality of plugin components, hardware components, and firmware components, whether the update is compatible with the respective hardware component; and installing, upon a determination that the update is compatible, the update on the system.

Clause 16 includes the subject matter of Clause 15, and further including detecting a connection of the plugin to the respective hardware component; identifying, based on an evaluation of the dependency matrix, whether an update for the respective firmware component is available; and upon a determination that the update is available, installing the update for the respective firmware component.

Clause 17 includes the subject matter of any of Clauses 15 and 16, and wherein the plurality of hardware components comprises downhole sensors in the oil and gas environment.

Clause 18 includes the subject matter of any of Clauses 15-17, and wherein installing the update on the system comprises installing the update to the one of the plurality of software plugin components while other of the plurality of software plugin components are executing on the system.

Clause 19 includes the subject matter of any of Clauses 15-18, and further including retrieving, from a server, a second dependency matrix; and updating the dependency matrix with information from the second dependency matrix.

Clause 20 includes the subject matter of any of Clauses 15-19, and wherein evaluating whether the update is compatible with the respective hardware component comprises querying the dependency matrix to determine whether the update to the software plugin component is compatible with the respective firmware component and respective hardware component.

Embodiments of the present disclosure may be implemented, in hardware, firmware, software, or any combination thereof. The embodiments of the present disclosure may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

As used herein, the singular forms "a," "an," and "the" are intended to include the plural forms as well, unless the context clearly indicates otherwise. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A computing system comprising:

one or more processors;

a memory storing a plurality of instructions, which, when executed on the one or more processors, causes the system to:

detect that an update is available for one of a plurality of software plugin components of a surface software application included in and executing on the system in an oil and gas environment, each software plugin component being associated with a respective one of a plurality of features of the surface software application, each plugin component in communication with a respective firmware component of a plurality of firmware components and a respective hardware component of a plurality of hardware components in the oil and gas environment;

evaluate, based on a dependency matrix mapping, by advantageously using the system to programmatically track and manage compatibilities with the plurality of plugin components, hardware components, and firmware components, whether the update is compatible with the respective hardware component; and install, upon a determination that the update is compatible, the update on the system, resulting in a rapid, automated update and installation process to reduce system downtime in the oil and gas environment.

2. The system of claim 1, wherein the plurality of instructions, when executed on the one or more processors, further causes the system to:

detect a connection of the plugin to the respective hardware component; and identify, based on an evaluation of the dependency matrix, whether an update for the respective firmware component is available.

3. The system of claim 2, wherein the plurality of instructions, when executed on the one or more processors, further causes the system to, communicate under program control with a repository to detect that the update is available; and upon a determination that the update is available, install the update for the respective firmware component.

4. The system of claim 1, wherein the plurality of hardware components comprises downhole sensors in the oil and gas environment.

5. The system of claim 1, wherein to install the update on the system comprises to install the update to the one of the plurality of software plugin components while others of the plurality of software plugin components are executing on the system.

6. The system of claim 1, wherein the plurality of instructions further causes the system to:

retrieve, from a server, a second dependency matrix; and update the dependency matrix with information from the second dependency matrix.

7. The system of claim 1, wherein to evaluate whether the update is compatible with the respective hardware component comprises to query the dependency matrix to determine whether the update to the software plugin component is compatible with the respective firmware component and respective hardware component.

8. A non-transitory computer-readable storage medium storing a plurality of instructions, which, when executed one or more processors, causes a computing system in an oil and gas environment to:

detect that an update is available for one of a plurality of software plugin components of a surface software application included in and executing on the system, each software plugin component being associated with a respective one of a plurality of features of the surface software application, each plugin component in communication with a respective firmware component of a plurality of firmware components and a respective hardware component of a plurality of hardware components in the oil and gas environment;

evaluate, based on a dependency matrix mapping, by advantageously using the system to programmatically track and manage compatibilities with the plurality of plugin components, hardware components, and firmware components, whether the update is compatible with the respective hardware component; and install, upon a determination that the update is compatible, the update on the system, resulting in a rapid, automated update and installation process to reduce system downtime in the oil and gas environment.

9. The computer-readable storage medium of claim 8, wherein the plurality of instructions, when executed on the one or more processors, further causes the system to:

detect a connection of the plugin to the respective hardware component; and identify, based on an evaluation of the dependency matrix, whether an update for the respective firmware component is available.

10. The computer-readable storage medium of claim 9, wherein the plurality of instructions, when executed on the one or more processors, further causes the system to, communicate under program control with a repository to detect that the update is available; and upon a determination that the update is available, install the update for the respective firmware component.

11. The computer-readable storage medium of claim 8, wherein the plurality of hardware components comprises downhole sensors in the oil and gas environment.

12. The computer-readable storage medium of claim 8, wherein to install the update on the system comprises to install the update to the one of the plurality of software plugin components while others of the plurality of software plugin components are executing on the system.

13. The computer-readable storage medium of claim 8, wherein the plurality of instructions further causes the system to:

retrieve, from a server, a second dependency matrix; and update the dependency matrix with information from the second dependency matrix.

14. The computer-readable storage medium of claim 8, wherein to evaluate whether the update is compatible with the respective hardware component comprises to query the dependency matrix to determine whether the update to the software plugin component is compatible with the respective firmware component and respective hardware component.

15. A computer-implemented method comprising:

detecting, by a computing system in an oil and gas environment, that an update is available for one of a plurality of software plugin components of a surface software application executing on the system, each software plugin component being associated with a respective one of a plurality of features of the surface software application, each plugin component in communication with a respective firmware component of a plurality of firmware components and a respective hardware component of a plurality of hardware components in the oil and gas environment;

evaluating, based on a dependency matrix mapping, by advantageously using the system to programmatically track and manage compatibilities with the plurality of plugin components, hardware components, and firmware components, whether the update is compatible with the respective hardware component; and installing, upon a determination that the update is compatible, the update on the system, resulting in a rapid, automated update and installation process to reduce system downtime in the oil and gas environment.

16. The computer-implemented method of claim 15, further comprising:

detecting a connection of the plugin to the respective hardware component;

identifying, based on an evaluation of the dependency matrix, whether an update for the respective firmware component is available; and upon a determination that the update is available, installing the update for the respective firmware component.

17. The computer-implemented method of claim 15, wherein the plurality of hardware components comprises downhole sensors in the oil and gas environment.

18. The computer-implemented method of claim 15, wherein installing the update on the system comprises installing the update to the one of the plurality of software plugin components while others of the plurality of software plugin components are executing on the system.

19. The computer-implemented method of claim 15, further comprising:

retrieving, from a server, a second dependency matrix; and updating the dependency matrix with information from the second dependency matrix.

20. The computer-implemented method of claim 15, wherein evaluating whether the update is compatible with the respective hardware component comprises querying the dependency matrix to determine whether the update to the software plugin component is compatible with the respective firmware component and respective hardware component.

* * * * *